United States Patent
Mu et al.

(10) Patent No.: US 8,930,001 B2
(45) Date of Patent: Jan. 6, 2015

(54) METHOD OF MODEL IDENTIFICATION FOR A PROCESS WITH UNKNOWN INITIAL CONDITIONS IN AN INDUSTRIAL PLANT

(75) Inventors: Shengjing Mu, Singapore (SG); Stephen Wei Hong Weng, Singapore (SG); Joseph Ching Hua Lee, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 374 days.

(21) Appl. No.: 13/235,800

(22) Filed: Sep. 19, 2011

(65) Prior Publication Data
US 2013/0073061 A1    Mar. 21, 2013

(51) Int. Cl.
G05B 13/02    (2006.01)
G05B 13/04    (2006.01)

(52) U.S. Cl.
CPC .................................. *G05B 13/041* (2013.01)
USPC .................. 700/29; 700/42; 706/16; 706/19; 706/46

(58) Field of Classification Search
USPC .............................. 700/29–31; 706/19, 26, 46
See application file for complete search history.

(56) References Cited

U.S. PATENT DOCUMENTS

| | | | | |
|---|---|---|---|---|
| 5,347,446 A | * | 9/1994 | Iino et al. | 700/29 |
| 6,912,515 B2 | * | 6/2005 | Jackson et al. | 706/19 |
| 7,058,617 B1 | * | 6/2006 | Hartman et al. | 706/16 |
| 7,346,403 B2 | * | 3/2008 | Tanaka et al. | 700/52 |
| 8,190,547 B2 | * | 5/2012 | Kirovski | 706/46 |
| 2006/0224255 A1 | * | 10/2006 | Tanaka et al. | 700/42 |
| 2006/0241787 A1 | * | 10/2006 | Tanaka et al. | 700/30 |
| 2007/0293957 A1 | * | 12/2007 | Tanaka et al. | 700/30 |
| 2009/0198350 A1 | * | 8/2009 | Thiele | 700/30 |

\* cited by examiner

*Primary Examiner* — Robert Fennema
*Assistant Examiner* — Anthony Whittington
(74) *Attorney, Agent, or Firm* — Westerman, Hattori, Daniels & Adrian, LLP

(57) ABSTRACT

A method of model identification for a process with unknown initial conditions in an industrial plant, the method comprising collecting a set of manipulated variables and corresponding set of process variables from the process; obtaining a plurality of manipulated variables from the collected set of manipulated variables; for each of the plurality of manipulated variables, obtaining optimal model parameters of a model transfer function and computing a model fitting index for optimized simulated process variables generated by the model transfer function using the optimal model parameters; identifying a best model fitting index among the model fitting indices computed; selecting a manipulated variable associated with the best model fitting index as an initial steady state condition for the model transfer function; and selecting the optimal model parameters corresponding with the best model fitting index as the best model parameters of the model transfer function to tune the controller.

6 Claims, 5 Drawing Sheets

METHOD OF MODEL IDENTIFICATION FOR A PROCESS WITH UNKNOWN INITIAL CONDITIONS IN AN INDUSTRIAL PLANT

TECHNICAL FIELD

The present invention relates generally to a method of model identification for a process in an industrial plant with unknown initial conditions.

BACKGROUND

To control a process in an industrial plant using a controller such as a proportional-integral-derivative controller (PID controller), manipulated variables are sent from the controller to a process element under control, such as a valve. Each manipulated variable is intended to adjust a function of the process element in an attempt to reach a desired output. The desired output is typically provided to the controller as a set-point. Process variables reflect the output of the process and are obtained by a sensor associated with the process element. A process variable is provided to the controller as a form of feedback in response to a corresponding manipulated variable, for comparison with the set-point, so that the controller can in turn provide a subsequent manipulated value to the process for adjusting the subsequent process variable to reach the set-point.

It will be appreciated that proper functioning of the controller is essential for correct control of the process, and to that end, model identification of the process is critical for tuning and advance designing of the controller. Model identification for process control is based on process step response data with sufficient excitation, such as the manipulated variables sent from the controller in response to the process variables received. However, the manipulated variables are inevitably not in an initial steady state condition because the plant condition keeps changing or disturbances from other aspects are experienced. Consequently, a manipulated variable with sufficient excitation but not in an initial steady state condition cannot be relied on as a starting point for identifying a good process model. In many cases, the process step data has to be abandoned because of failure to get a good fit of the resulting model with the actual process output obtained. Obtaining process step data for identifying a good process model is also costly because conducting step test on plant is time consuming and can cause plant upset, with risks on loss of product specification.

SUMMARY

The present invention maximizes or makes the best use of readily available process step data with unknown initial condition for model identification, while avoiding the repetition of collecting process step data. There is provided a method to select an initial steady state condition, from a set of available step data, that provides a good step response fitting, for reliable model identification. An iterative search for an initial steady state value is performed and within each iteration, a set of optimal model parameters and model fitting index are obtained for tuning the controller.

According to an exemplary aspect, there is provided a method of model identification for a process with unknown initial conditions in an industrial plant, the method comprising: collecting a set of manipulated variables and a corresponding set of process variables from the process, the manipulated variables being sent from a controller to the process for adjusting each process variable to reach a set-point, the set point being a desired value for each process variable, each process variable being obtained by a sensor provided in the process; obtaining a plurality of manipulated variables from the collected set of manipulated variables; for each of the plurality of manipulated variables, obtaining optimal model parameters of a model transfer function and computing a model fitting index for optimized simulated process variables generated by the model transfer function using the optimal model parameters; identifying a best model fitting index among the model fitting indices computed; selecting a manipulated variable associated with the best model fitting index as an initial steady state condition for the model transfer function; and selecting the optimal model parameters corresponding with the best model fitting index as the best model parameters of the model transfer function to tune the controller.

Obtaining optimal model parameters may comprise searching for and identifying model parameters that result in a minimized fitting error between simulated process variables generated by the model transfer function and the collected set of process variables.

The model fitting index may be a function of the minimized fitting error.

The best model fitting index may be a highest model fitting index among the computed model indices that are above a predetermined threshold value.

Identifying the best model fitting index may include confirming that the model parameters computed for a second highest model fitting index among the computed model fitting indices that are above the predetermined threshold value are within a specified difference from the model parameters computed for the highest model fitting index.

The plurality of manipulated variables may comprise manipulated variables selected at intervals from a first percentage of the collected set of manipulated variables.

BRIEF DESCRIPTION OF THE FIGURES

Preferred embodiments of the apparatus and method will now be described with reference to the accompanying figures in which.

DETAILED DESCRIPTION OF THE PREFERRED EMBODIMENTS

Exemplary embodiments of a method 100 of modeling a process 10 in an industrial plant will now be described with reference to FIGS. 1 to 7.

Figure 1:
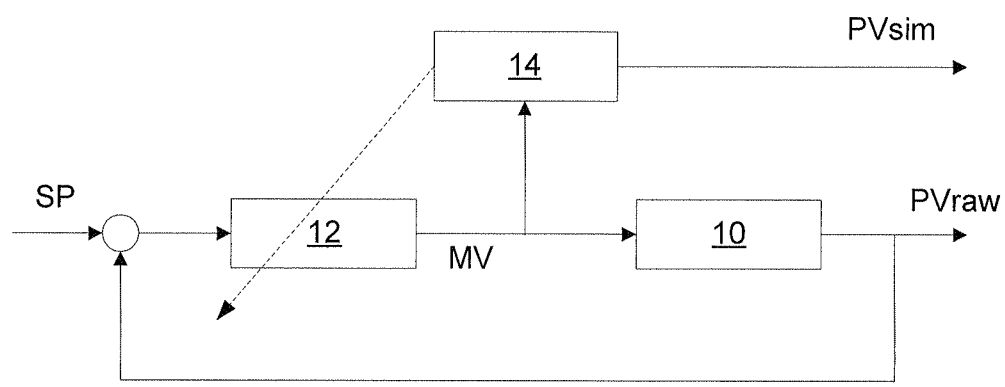
FIG. 1 is a schematic process control and controller tuning diagram.
Figure 2:
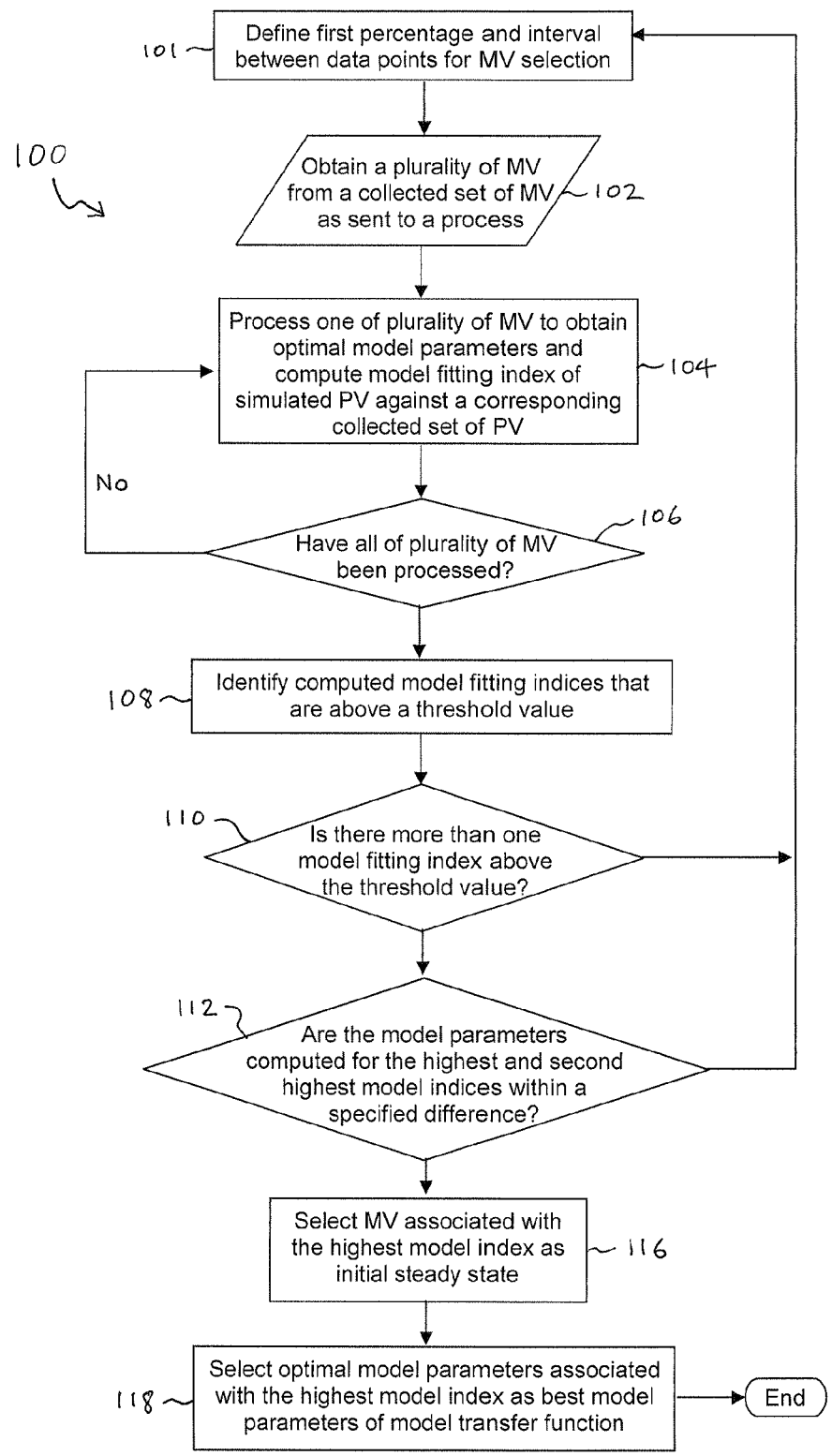
FIG. 2 a flow chart of an exemplary embodiment of a method of modeling a process.
Figure 3:
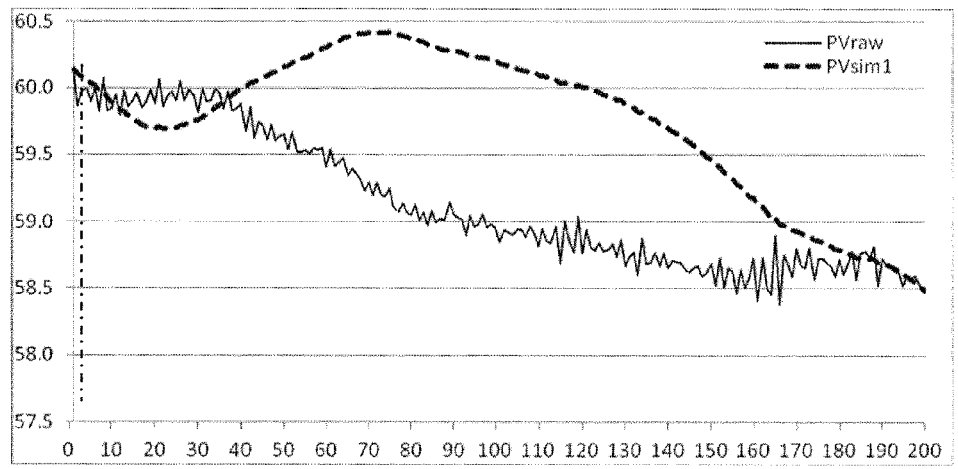
FIG. 3 is a graph comparing optimized simulated process variables with collected process variables using as an initial steady state a manipulated variable at a $1^{st}$ data point.
Figure 4:
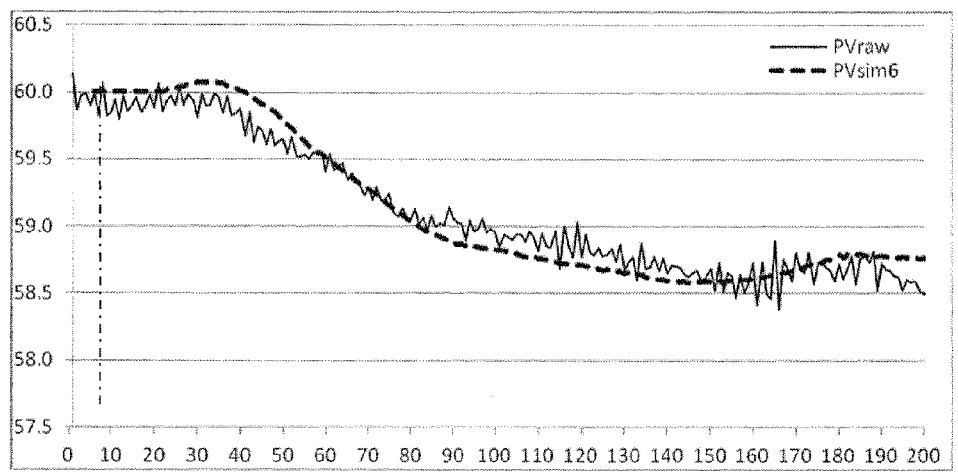
FIG. 4 is a graph comparing optimized simulated process variables with collected process variables using as an initial steady state a manipulated variable at a $6^{th}$ data point.
Figure 5:
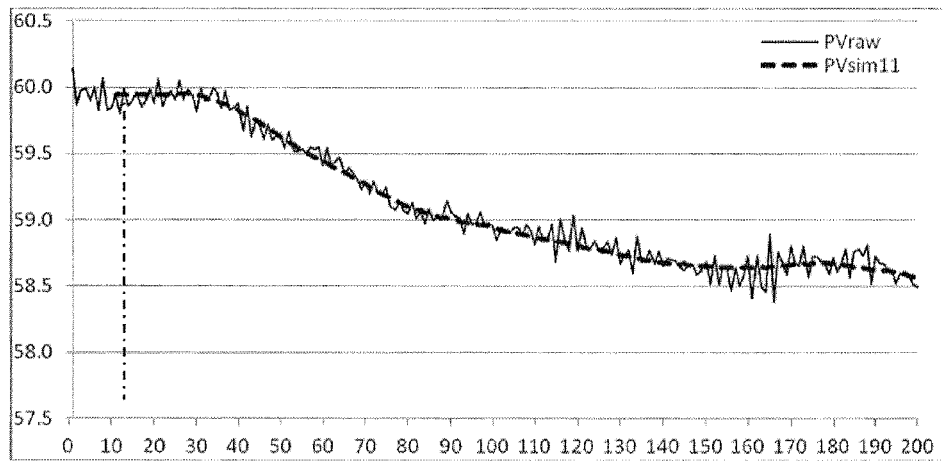
FIG. 5 is a graph comparing optimized simulated process variables with collected process variables using as an initial steady state a manipulated variable at an $11^{th}$ data point.
Figure 6:
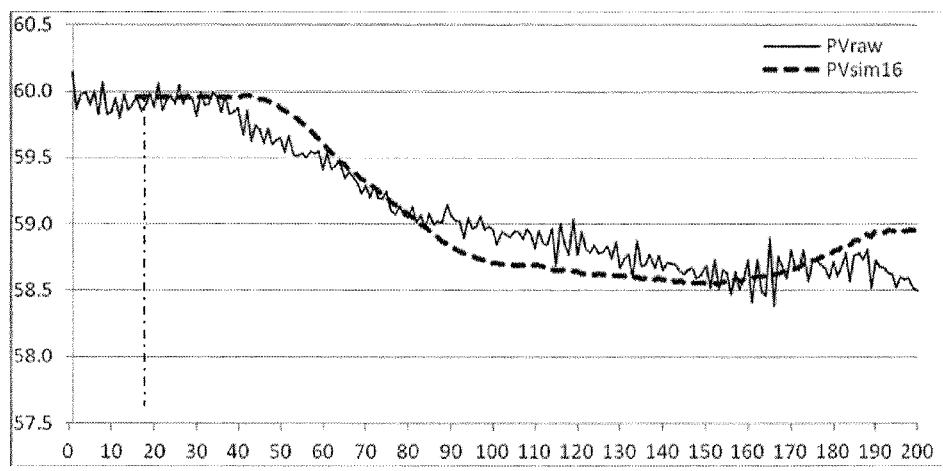
FIG. 6 is a graph comparing optimized simulated process variables with collected process variables using as an initial steady state a manipulated variable at a $16^{th}$ data point.

As shown in FIG. 1, the process 10 in the industrial plant is controlled by a controller 12. The controller 12 is preferably a PID controller 12. The controller 12 receives a set-point (SP) which is a desired output of the process 10. Manipulated variables (MV) are sent from the controller 12 to the process 10 for achieving the set-point. Process variables (PV) are collected from the process 10 via a sensor (not shown) operatively connecting the process 10 with the controller 12. The PV serves as feedback to the controller 12 for adjusting the MV to be sent to the process 10, in order to adjust the next PV to reach the SP.

A modeling module 14 is provided for model identification to obtain optimal model parameters of a model transfer function. The model transfer function may be a first order plus time delay (FOPTD) model transfer function as shown by equation (1) below:

$$y(s) = \frac{K_p \cdot e^{-\theta_p \cdot s}}{\tau_p \cdot s + 1} x \quad (1)$$

Where
$\hat{y}(t)$=predicted output variable (PV)
x=measured input variable (MV)
Kp=static process gain
$\theta_p$=process time delay
$\tau_p$=process time constant Alternatively, the model transfer function may be an integrator plus time delay (IPTD) model transfer function as shown by equation (2) below:

$$y(s) = \frac{K_p^* \cdot e^{-\theta_p \cdot s}}{s} x \quad (2)$$

Where
$K_p^*$=velocity process gain
$\theta p$=process time delay

Model parameters such $K_p$, $\tau_p$, $\theta_p$ for FOPTD model or $K^*_p$, $\theta_p$ for IPTD model are used to calculate tuning parameters of the controller 12 for controlling the process 10. Accordingly, it is desirable to obtain optimal model parameters for use by the controller 12 in order to optimally control the process 10.

To do so, a set of MV that is sent from the controller 12 to the process 10, including at least the data of a settled step response, is first collected together with a corresponding set of PV. From the collected set of MV, a plurality of MV is obtained 102. This plurality of MV typically comprises MV selected at intervals from a first percentage of the collected set of MV.

Figure 7:
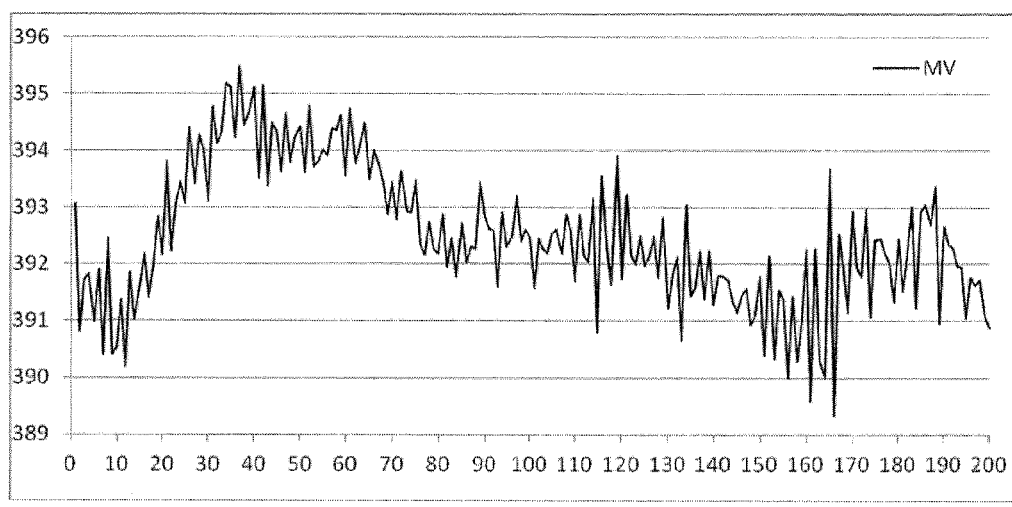
FIG. 7 is a graph of collected manipulated variables corresponding to the collected variables of FIGS. 3 to 6.

For example, the plurality of MV may be selected at 5 data point intervals from a first 10% of the collected set of MV. To further exemplify, where the collected set of MV comprises 200 data points as shown in FIG. 7, the plurality of MV may comprise 4 MV values, taken at the $1^{st}$, $6^{th}$, $11^{th}$ and $16^{th}$ data points. The first percentage is preferably, but not limited to, 10% to 20% of the collected set of MV, depending on the specific process, and the intervals may be any non-negative integers. Defining the first percentage of the collected set of MV and the intervals between data points 101 for selection of the plurality of MV is therefore required prior to actual selection of the plurality of MV.

Each of the plurality of MV is processed to obtain optimal model parameters and to compute a model fitting index of simulated PV against the corresponding collected set of PV 104, as will be described further below. This step 104 is repeated if necessary, following checking whether all the plurality of MV have been processed 106.

Optimal model parameters of the model transfer function for each of the plurality of MV is obtained by searching for and identifying model parameters that result in a minimized fitting error between simulated process variables that are generated by the model transfer function and the collected set of process variables.

The search for optimal model parameters for each of the plurality of manipulated variables may be performed by using any known optimization method. The Nelder-Mead method [Nelder, John A.; R. Mead (1965) "A simplex method for function minimization" Computer Journal 7: 308-313] is an example of a preferred optimization method. For each step in the search, a set of tentative model parameters is used in the model transfer function to generate simulated PV. The generated simulated process parameters are then compared against the collected set of PV to calculate a fitting error. The fitting error is the sum of the square of error between the collected set of PV and the simulated PV, as shown by equation (3) below:

$$Fit_{err} = \sum_{i}^{n}(y_i - \hat{y}_i)^2 \quad (3)$$

where
$y_i$=vector of measured output variable ($PV_{raw}$)
$\hat{y}_i$=vector of predicted output variable ($PV_{sim}$)

Multiple sets of tentative model parameters are searched in attempting to minimize the fitting error between the simulated PV and the collected set of PV. When a minimized fitting error is established, the corresponding model parameters used in generating the optimized simulated PV that gave the minimized fitting error are recorded as the optimal model parameters for that particular MV.

A model fitting index is also computed for the minimized fitting error obtained for that particular MV 104. The model fitting index is a function of the minimized fitting error. The model fitting index ranges from 0-100, with 100 being indicative of a (theoretical) perfect fit between the simulated PV and the collected set of PV. The model fitting index is set as zero for any computed index value less than zero. The model fitting index may be computed using equation (4) as shown below:

$$ModelFittingIndex = 100 \times \left[1 - \frac{SS_{err}}{SS_{tot}}\right] \quad (Eq. 4)$$

Where $$SS_{err} = \sum_{i}(y_i - \hat{y}_i)^2$$

is the Sum of Squared Error $$SS_{tot} = \sum_{i}^{n} (y_i - \bar{y})^2$$

is the Total Sum of Error Squares $y_i$=vector of measured output variable ($PV_{raw}$)
$\hat{y}_i$=vector of predicted output variable ($PV_{sim}$)
$\bar{y}$=average value of measured output variable Continuing with the example begun above, for each of the $1^{st}$, $6^{th}$, $11^{th}$ and $16^{th}$ MV, optimal model parameters are obtained and a model fitting index is computed. Thus, 4 sets of optimal model parameters are obtained and 4 corresponding model fitting indices are computed from the plurality of MV obtained from the collected set of MV. Using the IPTD model as an example, model parameters Kp and $\theta_p$ are computed for each model fitting index.

Among the model fitting indices computed, a best model fitting index is identified. The best model fitting index is a highest model fitting index among the computed model indices that are found to be above a predetermined threshold value 108. Preferably, there is more than one model fitting index above the threshold value 110. A second highest model fitting index among the computed model indices is also identified. The model parameters computed for the second highest model fitting index should preferably be within a specified difference from the model parameters computed for highest model fitting index 112, in order for the highest model fitting index to be considered valid. For example, both the highest and second highest fitting indices calculated should each be above a threshold value of 80 at least, and the difference between their corresponding computed model parameters should not be more than ±100%. If there is only one model fitting index found to be above the threshold value, or the second highest model fitting index is not within a specified difference from the highest model fitting index, the best model fitting index cannot be validly confirmed and the method returns to re-define the first percentage of data and re-define the intervals 101 for selecting a new plurality of MV from the collected set of MV.

Upon identification of the best model fitting index, the MV associated with the best fitting model index is accordingly selected as the initial steady state condition for the model transfer function 116. The optimal model parameters associated with the best model fitting index are also accordingly selected as the best model parameters of the model transfer function 118, and appropriately provided for tuning the controller 12.

Continuing with the example above, as shown in each of FIGS. 3 to 6, a graph of optimized simulated PV has been plotted against the graph of the collected set of PV for each of the $1^{st}$, $6^{th}$, $11^{th}$ and $16^{th}$ MV respectively. The collected set of PV is the same for all, but it can be seen that the optimized simulated PV varies, and the fit of the simulated PV also varies, depending on which of the $1^{st}$, $6^{th}$, $11^{th}$ and $16^{th}$ MV has been used as the initial steady state condition. The 4 model fitting indices computed and the 4 sets of optimal model parameters obtained for the $1^{st}$, $6^{th}$, $11^{th}$ and $16^{th}$ MV are shown in table 1 below:

TABLE 1

| MV Data Point | Model Fitting Index | Optimal Model Parameters (Kp* and $\theta_p$) |
|---|---|---|
| 1 | 0 | 0.0783 and 1 |
| 6 | 91.5518 | −0.0567 and 16 |
| 11 | 97.4438 | −0.0343 and 12 |
| 16 | 78.4521 | −0.0687 and 24 |

From the model fitting indices computed and as substantiated by observation of the graphs in FIGS. 3 to 6, it is evident that the $11^{th}$ MV used as an initial steady state provides the best simulated PV generated from the model transfer function, having the highest model index of 97.4438. The second highest model index is 91.5518 from the $6^{th}$ MV. Their respective corresponding computed model parameter Kp* are −0.0567 and −0.0343, while computed model parameter $\theta_p$ are 16 and 12. The computed model parameters of the highest and second highest model indices are thus within a difference of ±100% from each other, thereby validating the $11^{th}$ MV as providing the best model index. Accordingly, the optimal model parameters of −0.0343 and 12 obtained for the $11^{th}$ MV are selected as the best model parameters to tune the controller 12, together with the value of the $11^{th}$ MV as the best initial steady state for modeling the process 10.

Using the above method 100, it is thus now possible to search for and obtain optimal model parameters from process response data in the form of MV collected from the process. This makes full use of readily available data from a process with unknown initial conditions to optimize model identification for use by the controller 12, while avoiding the repetition of collecting process step data.

Whilst there has been described in the foregoing description preferred embodiments of the present invention, it will be understood by those skilled in the technology concerned that many variations or modifications in details of design or construction may be made without departing from the present invention. For example, other than the FPTD and IPTD model transfer functions mentioned above, other model transfer functions may be used according to the type of process to be controlled.

The invention claimed is:
1. A method of model identification for a process in an industrial plant, the method comprising:
    collecting a set of manipulated variables and a corresponding set of process variables from the process, the manipulated variables being sent from a controller to the process for adjusting each process variable to reach a set-point, the set point being a desired value for each process variable, each process variable being obtained by a sensor provided in the process, wherein initial conditions of the process are unknown;
    selecting a plurality of manipulated variables from the collected set of manipulated variables;
    for each of the plurality of manipulated variables,
        obtaining optimal model parameters of a model transfer function, the model transfer function being one of: a first order plus time delay model transfer function and an integrator plus time delay model transfer function, and
        computing a model fitting index for optimized simulated process variables generated by the model transfer function using the optimal model parameters wherein the computing uses the following equation:

$$\text{model fitting index} = 100 \times \left[1 - \frac{\text{Sum of Squared Errors}}{\text{Total Sum of Error Squares}}\right];$$

identifying a best model fitting index among the model fitting indices computed;

selecting a manipulated variable associated with the best model fitting index as an initial steady state condition for the model transfer function; and selecting the optimal model parameters corresponding with the best model fitting index as the best model parameters of the model transfer function to tune the controller.

2. The method of claim 1, wherein obtaining optimal model parameters comprises searching for and identifying model parameters that result in a minimized fitting error between simulated process variables generated by the model transfer function and the collected set of process variables.

3. The method of claim 2, wherein the model fitting index is a function of the minimized fitting error.

4. The method of claim 1, wherein the best model fitting index is a highest model fitting index among the computed model indices that are above a predetermined threshold value.

5. The method of claim 4, wherein identifying the best model fitting index includes confirming that the model parameters computed for a second highest model fitting index among the computed model fitting indices that are above the predetermined threshold value are within a specified difference from the model parameters computed for the highest model fitting index.

6. The method of claim 1, wherein the plurality of manipulated variables comprises manipulated variables selected at intervals from a first percentage of the collected set of manipulated variables.

* * * * *